(12) United States Patent
Kapp et al.

(10) Patent No.: US 7,631,576 B2
(45) Date of Patent: Dec. 15, 2009

(54) GROOVE FOLLOWER FOR A SHIFT DRUM OF A MULTI-STEP TRANSMISSION

(75) Inventors: Stefan Kapp, Walheim (DE); Andreas Palme, Heilbronn (DE)

(73) Assignee: Getrag Getriebe- und Zahradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 522 days.

(21) Appl. No.: 11/429,641

(22) Filed: May 5, 2006

(65) Prior Publication Data

US 2006/0283681 A1    Dec. 21, 2006

Related U.S. Application Data

(63) Continuation of application No. PCT/EP2005/007939, filed on Jul. 21, 2005.

(30) Foreign Application Priority Data

Oct. 22, 2004    (DE) .................... 20 2004 016 475 U

(51) Int. Cl.
*F16H 63/18*    (2006.01)

(52) U.S. Cl. .............................. 74/569; 74/55; 74/337.5

(58) Field of Classification Search ................. 74/337.5, 74/473.36, 567, 569, 55
See application file for complete search history.

(56) References Cited

U.S. PATENT DOCUMENTS 1,819,889 A * 8/1931 Getz ......................... 74/337.5
5,735,176 A    4/1998 Winkam et al.

FOREIGN PATENT DOCUMENTS

DE    199 24 335    12/2000

* cited by examiner

*Primary Examiner*—William C Joyce
(74) *Attorney, Agent, or Firm*—Knobbe Martens Olson & Bear LLP

(57) ABSTRACT

A groove follower (70; 90) for cooperating with a shift groove (48) of a shift drum (44) of a multi-step transmission for a motor vehicle, the groove follower (70; 90) having a vertical crowning and a longitudinal crowning, and the shift groove (48) defining an active diameter along which the groove follower (70; 90) is to be guided in a state in which the groove follower (70; 90) engages into the shift groove (48), and the entirety of all the vertices ($S_{HB}$) of the vertical crowning forming a guide curve (L) along the circumference of the groove follower, characterized in that the position of the vertices of the vertical crowning is selected such that the guide curve (L) corresponds essentially to the active diameter of the shift drum (44).(FIG. 5)

5 Claims, 9 Drawing Sheets

GROOVE FOLLOWER FOR A SHIFT DRUM OF A MULTI-STEP TRANSMISSION

CROSS-REFERENCE TO RELATED APPLICATIONS

This is a continuation application of co-pending International Patent Application PCT/EP 2005/007939 filed on Jul. 21, 2005 which, in turn, claims priority of German application DE 20 2004 016 475.2 filed on Oct. 22, 2004 which is fully incorporated by reference herewith.

BACKGROUND OF THE INVENTION

The present invention relates to a groove follower for cooperating with a shift groove of a shift drum of a multi-step transmission for a motor vehicle, the groove follower having a vertical crowning and a longitudinal crowning, and the shift groove defining an active diameter along which the groove follower is to be guided in a state in which the groove follower engages into the shift groove, wherein the entirety of all the vertices of the vertical crowning forms a guide curve along the circumference of the groove follower.

DESCRIPTION OF THE RELATED PRIOR ART

Groove followers, in particular sliding blocks, rolls or similar cam followers, are generally known in the prior art.

The groove follower in this case cooperates with a shift groove of a shift drum for engaging or disengaging a transmission gear. Shift drums are generally known in the prior art, as is defined, for example, by DE 199 24 335 A. Shift drums have a recess, what is known as the shift groove, along their circumference. The axially displaceable groove follower is led or guided in the shift groove. In the event of rotational movements of the shift drum, which serve, as a rule, for the sequential shifting of a multi-step transmission, the groove follower can consequently be moved axially. Furthermore, the groove follower cooperates, for example, with what is known as a shift fork, the shift fork, in turn, being coupled to a shift sleeve, with the aid of which a gear change can be initiated. The shift drum thus constitutes an actuating device in a multi-step transmission.

The shift drums themselves are driven by means of an actuating drive, such as, for example, a motor, in particular an electric motor. Then, if a gear is to be engaged which is coupled to the groove follower, the shift drum and therefore also the shift groove are rotated with the aid of the electric motor. The control groove has curve-shaped regions, also called shift teeth or shift cams, due to which the groove follower is displaced axially. In these curve-shaped regions, the shift groove, which normally runs straight in a circumferential direction, is displaced in an axial direction.

A plurality of groove followers assigned to various gears can be led in the shift groove. A single groove follower may, if appropriate, even be assigned to a plurality of gears, namely such that an axial displacement of the groove follower from a neutral position into a first axial direction engages one gear and an axial displacement of the groove follower from the neutral position into the opposite axial direction engages another gear.

The prior art discloses groove followers, in particular sliding blocks, which have a predetermined constant height H. Such a sliding block will be described in more detail below. The upper surface and the lower surface of such a groove follower are, as a rule, formed planar and parallel to each another.

However, as seen in the axial direction of the shift roller, the shift groove of the shift drum is substantially formed circularly. The circular shape of the shift groove in a section perpendicular to the axis of the shift drum arises due to the rotationally symmetrical construction of the shift drum.

The shift drum or the shift grooves defines what is known as an active diameter, along which contact between the groove follower and the groove of the shift drum or the flanks of the latter ideally is formed. The active diameter is a functional parameter on which the theoretical design of the geometry the shift drum and therefore of the entire actuator mechanism is based.

If, then, a groove follower according to the prior art is inserted into the shift groove, the groove follower and the shift drum do not mate optimally with one another, since the groove follower "advances" the ideal contact point of the groove follower with the shift groove, i.e. the line of the active diameter (cf. FIG. 5).

The groove follower, in particular a sliding block, preferentially contacts the lateral flanks of the shift groove above the active diameter.

This may result in damage and malfunctions of the groove of the shift drum in regions subjected to high load, such as at the synchronization point and shift-through point.

Furthermore, the Hertzian pressure must be taken into account. Hertzian pressure is to be understood as highest mechanical stresses which prevail in the middle of mutually contacting surfaces of two elastic bodies. When two elastic bodies with a curved surface, such as cylinders or balls, are pressed against one another, then they (theoretically) contact each another only linearly or in a punctiform manner. As a result of the elasticity of the bodies, however, a flattening or contact surface occurs at the contact point. A characteristic pressure distribution arises in both bodies along the contact surface, the stress always being highest in the middle of the contact surface.

When two balls, a ball and a plane or two crossed cylinders contact, this gives rise to a contact or pressure ellipse. The contact of two parallel cylinders or of one cylinder with a plane gives rise to a linear contact surface. This is then also referred to as roller pressure.

According to the theories of the German physicist Heinrich Hertz, size and shape of the contact surfaces and the height and distribution of the mechanical stresses beneath the contact surfaces can be calculated. According to Hertz, the highest mechanical stress prevailing in the middle of the contact surface is also known as Hertzian pressure.

The amount of the Hertzian pressure depends on the force by which the two bodies are pressed onto each another, on their radii of curvature, and on their moduli of elasticity.

Furthermore, the concept of crowning will play an important part below. Crowning is to be understood as a slight (convex) curvature of surfaces, for example of surfaces on machine parts or tools. By means of the crowning, unfavorable (punctiform) pressure or force peaks, for example in the vicinity of edges, can be avoided. Thus, for example, the flanks of gearwheels or the running faces of belt pulleys are of crowned design.

FIG. 1 exemplarily illustrates, in a diagrammatical manner, the crowning by using a parallelepiped which is indicated by a dashed line. The parallelepiped shown in a perspective view in FIG. 1 has a height H, a width B and a depth T. Furthermore, a Cartesian coordinate system having the axes X, Y and Z is illustrated in order to simplify the explanation.

The left edge of the front side of the parallelepiped is used in FIG. 1 in order to explain the vertical crowning. In the case of a parallelepiped without crowning, this edge (dashed line)

is oriented parallel to the X-axis. The X-axis in this case represents the height of the parallelepiped. If the end face of the parallelepiped is to have vertical crowning, the XY-plane is inflated in the negative Z-direction. In a case of symmetrical vertical crowning, this may take place, for example, along the median line with respect to the height H. In this instance, the vertex $S_{HB}$ of the vertical crowning lies at the height H/2. The vertex $S_{HB}$ of the vertical crowning is characterized in that, there, the distance d from the X-axis of a "normal" parallelepiped is greatest.

The other outer faces of the parallelepiped can be "inflated" in a similar way.

If the vertices $S_{HB}$ of the vertical crowning, such as are illustrated by dots, are connected to one another along the circumference of the crowned parallelepiped, the so-called guide curve L of the vertical crowning is obtained.

The guide curve L of the vertical crowning represents a line at which the crowned parallelepiped would, for example, contact a wall, if, presupposing that the bottom surface of the parallelepiped is not curved, the crowned parallelepiped were laid on the ground and pushed against the same wall.

The object of the present invention, therefore, is to provide an improved groove follower which is subject to less rapid wear.

SUMMARY OF THE INVENTION

This object is achieved by means of a groove follower as mentioned at the outset, wherein the position of the vertices of the vertical crowning is selected such that the guide curve corresponds substantially to the active diameter of the shift drum.

This gives rise to an optimum bearing or contact pattern between the contacting faces or flanks of the groove follower and groove of the shift drum, since the contact in the shift drum groove is allowed to become marked centrally with respect to the height of the groove flank.

Likewise on account of this, there is smaller wear and slighter deformation of the flanks of the mutually contacting shift drum and groove follower.

This results in that the shape of the shift drum groove changes to a lesser extent, wherein the functioning of the overall transmission becomes safer.

Furthermore, the lifetime is increased.

Finally, materials, which have to satisfy lower requirements on material strength, can be used both for the groove follower and for the shift groove.

The shift center point of the Hertzian pressure ellipse lies substantially on the line of the active diameter of the shift drum.

The contact points, which actually result, correspond to the theoretically precalculated points.

Furthermore, it is preferred if the vertical crowning is provided not only along the contact faces of the groove follower to the shift groove, but also along the entire circumference of the groove follower.

By this measure it is achieved that, should the orientation of the groove follower in relation to the shift drum, and therefore to the shift groove, change, the groove follower nevertheless comes into contact with a corresponding flank of the shift groove along the active diameter.

Furthermore, it is preferred if the groove follower is a sliding block.

As will be explained in more detail below, a sliding block usually has a (rhombus-like) or lozenge-shaped base, the corner points being rounded and the sliding block coming into contact, preferably with its essentially rectilinear faces, with the shift groove. These contact faces ensure a reliable cooperation of the groove follower with the shift groove, since contact with the latter occurs over a large area.

According to a preferred embodiment, the groove follower has a contact slope, the longitudinal crowning of the groove follower being formed along the contact slope.

As a result of the longitudinal crowning, the Hertzian pressure is likewise reduced, specifically not only in the vertical direction, but also in the circumferential direction of the shift groove.

Moreover, it has proved advantageous if a surface of the groove follower which lies opposite to the bottom of the shift groove has a curvature which corresponds essentially to a curvature of the shift groove.

This measure ensures that, in a state in which the groove follower engages into the shift groove, the groove follower can penetrate as deeply as possible into the shift groove itself, so that shifting safety is further increased.

It will be appreciated that the features mentioned above and those yet to be explained below can be used not only in the combination specified in each case, but also in other combinations or alone, without departing from the scope of the present invention.

Exemplary embodiments of the invention are illustrated in the drawing and are explained in more detail in the following description. In the drawing:

DESCRIPTION OF PREFERRED EMBODIMENTS

As already mentioned above, FIG. 1 shows by dashed lines a parallele-piped which is of crowned design (unbroken line).

Figure 2:
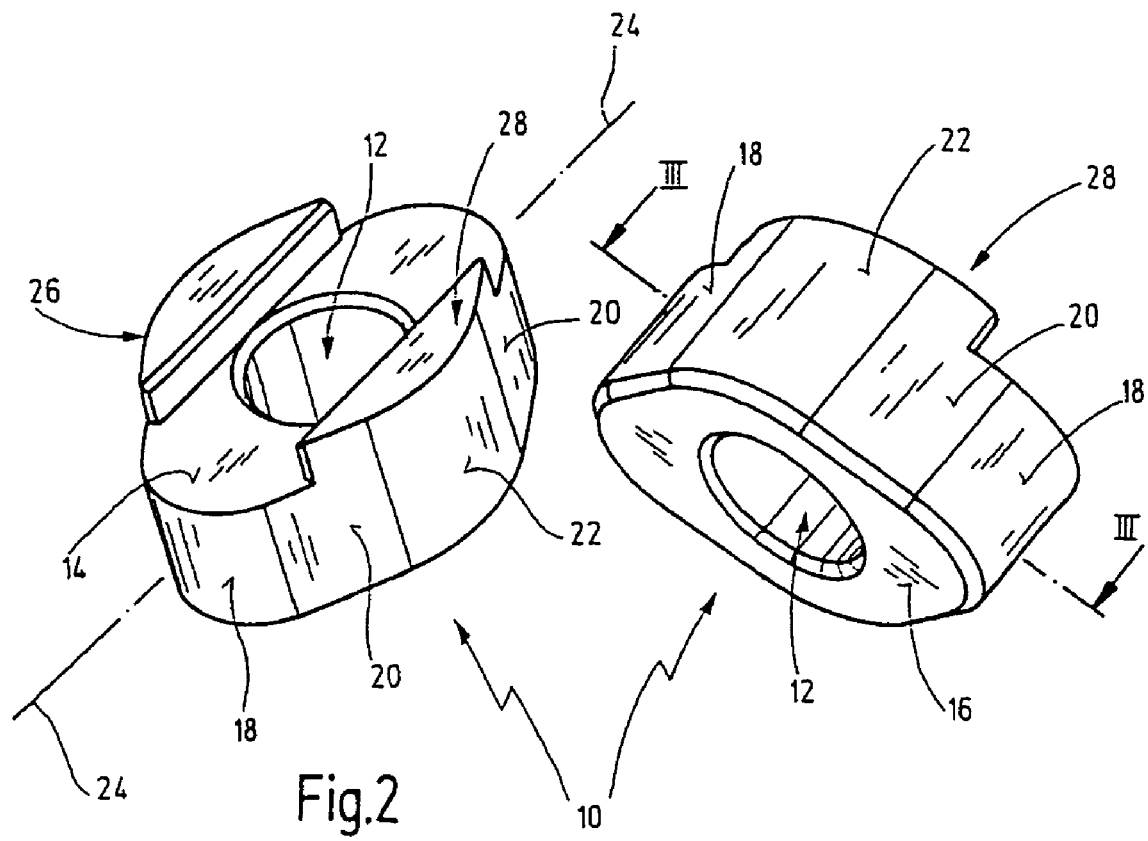
FIG. 2 shows two diagrammatic perspective views of a sliding block.

FIG. 2 shows a sliding block 10 in two diagrammatic perspective views, namely in a view from top left and a view from bottom right. The sliding block 10 has an (optional) orifice 12 along the direction of its height. Elements (not illustrated), by means of which the sliding block 10 can be coupled, for example, to a shift fork (not illustrated), can be introduced into the orifice 12.

The sliding block has an upper surface 14 and a bottom surface 16 which, in the example illustrated in FIG. 2, are designed to be parallel to one another. The circumference of the sliding block 10 is formed from a plurality of flank elements 18, 20 and 22.

With the sliding block 10 illustrated on the left-hand side of FIG. 2, the longitudinal axis 24 is indicated by dashes and dots.

Furthermore, the upper surface 14 has two elevations 26 and 28 which, however, are less important for the function of the invention and, therefore, will not be explained in more detail.

The sliding block 10 is led or guided in a shift groove (not illustrated) of a shift drum (not illustrated) by means of the flank elements 18 to 22.

Figure 3:
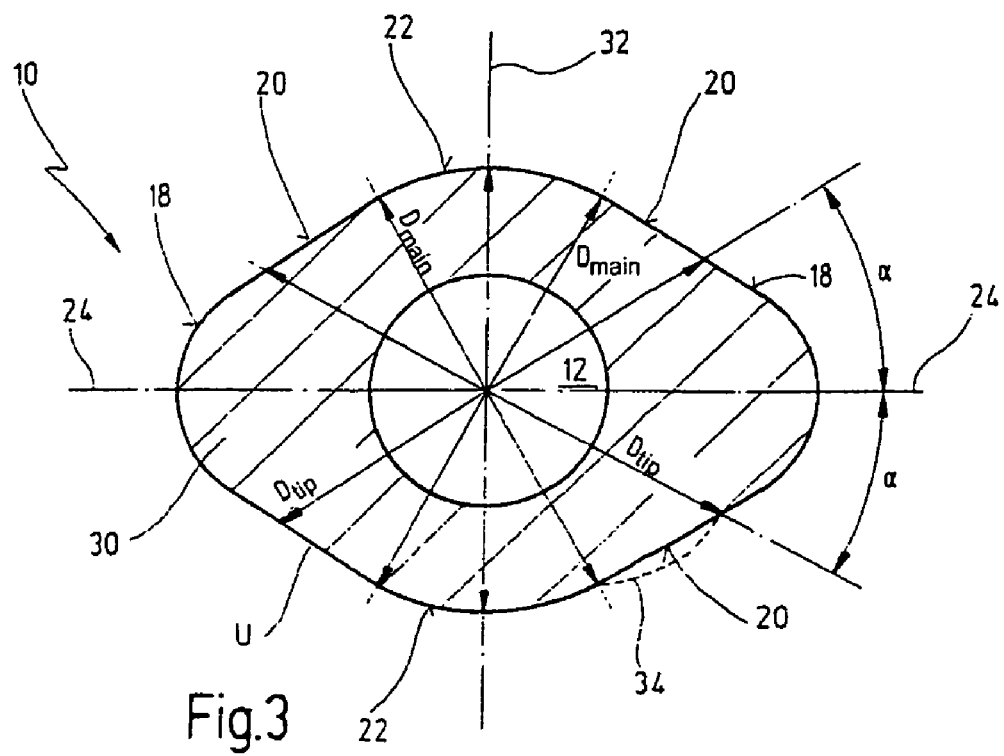
FIG. 3 shows a sectional view along the line III-III of the sliding block according to FIG. 2.

FIG. 3 indicates a diagrammatic sectional view along the line III-III of the sliding block 10 illustrated on the right in FIG. 2.

The sectional surface 30 illustrated in FIG. 3 is oriented parallel to the upper surfaces 14 and the bottom surfaces 16 with respect to the sliding blocks 10 illustrated in FIG. 2. The sectional surface 30 is thus oriented perpendicularly to the height (not illustrated). The surface 30 has a circular recess which is due to the orifice 12.

The outer contour line U of the surface 30 is formed by a plurality of flank elements 18 to 22. The width of the sliding block 10 is indicated by means of a further dashed and dotted line 32 which is oriented perpendicularly to the longitudinal direction 24. In the region of a main flank 22, the outer surface of the sliding block 10 is curved in the circumferential direction having a radius which corresponds to half a main diameter $D_{Main}$.

A contact slope 20 (cf. also FIG. 2) respectively follows the main flanks 22. The contact slope 20 is designed to be virtually rectilinear, i.e. planar with respect to the surface, with the exception of its longitudinal crowning which is illustrated, exaggerated for the sake of clarity, by means of a dashed line 34 in the right lower part of the sectional surface 30. A crowning along the contour U of the sectional surface 30 is generally designated hereinafter as longitudinal crowning, wherein length and width of the sliding block 10 will not be distinguished. The term "vertical crowning", likewise used, will be explained in more detail in connection with FIG. 4D.

The contact slopes 20 of FIG. 3 constitute, as a rule, those parts of the sliding block 10 which cooperate with the shift groove (not illustrated) or its groove flanks (not illustrated). Since, as mentioned initially, the shift groove has so-called shift teeth in order to move a gear between a neutral position and a position in which the gear is engaged, the groove flanks, as a rule, are likewise sloped in relation to the circumference of a shift drum in the region of shift teeth, so that large-area contact between the contact slopes and the groove flanks of the shift groove of the shift drum usually occurs during a gear change.

The contact slopes 20 are respectively followed by tip flanks 18. The tip flanks 18 respectively form the head and end of the sliding block 10 in the longitudinal direction 24. The tip flanks 18 cover a tip angle of 2α and are rounded with half the diameter $D_{tip}$.

FIGS. 4A to 4D show a further sliding block 40.

FIG. 4A shows the sliding block 40 from below. FIG. 4B shows the sliding block 40 laterally. FIG. 4C shows the sliding block 40 in a top view. FIG. 4D shows the sliding block 40, as seen from the longitudinal direction 24. This corresponds to the front view. Features which are similar to those of the sliding block shown in FIG. 2, are provided with like reference symbols.

Figure 4:
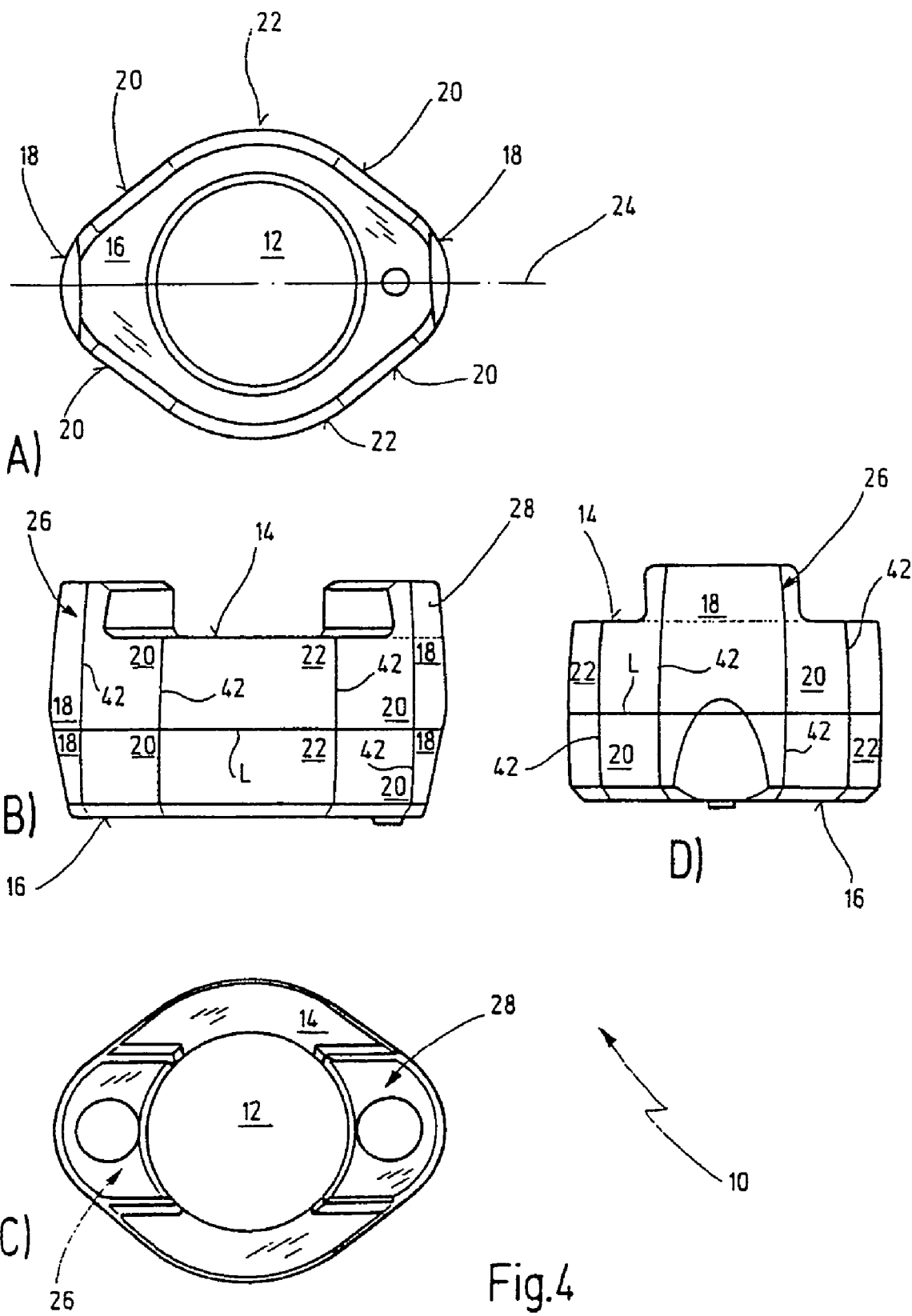
FIGS. 4A to 4D show various views of a further sliding block.

The sliding block illustrated in FIG. 4 differs from the sliding block 10 illustrated in FIG. 2 essentially in that the elevations 26 and 28 of the sliding block 40 of FIG. 4, which are limited essentially by the main flanks 22, are not provided in the middle region. The elevations 26 and 28 are provided in the end regions which are essentially limited outwardly by the tip flanks 18.

Furthermore, FIGS. 4B and 4D illustrate a guide curve L of the vertical crowning. In conventional sliding blocks, this guide curve runs parallel to the surfaces 14 and 16 which form the upper surface and bottom surface of the sliding block 40, respectively. Furthermore, with reference to the auxiliary lines 42, it can be seen clearly that these surfaces are formed crowned with respect to the vertical direction. This is expressed in that the auxiliary lines 42 which represent the transitions between the various flank elements 18 to 22 are curved lines having a predetermined radius of curvature. It can be seen, furthermore, that the vertices of the vertical crowning for each unit element of the circumference all lie at the same height otherwise the guide curve L of the vertical crowning would be arranged parallel to the surfaces 14 and 16 either.

Figure 5:
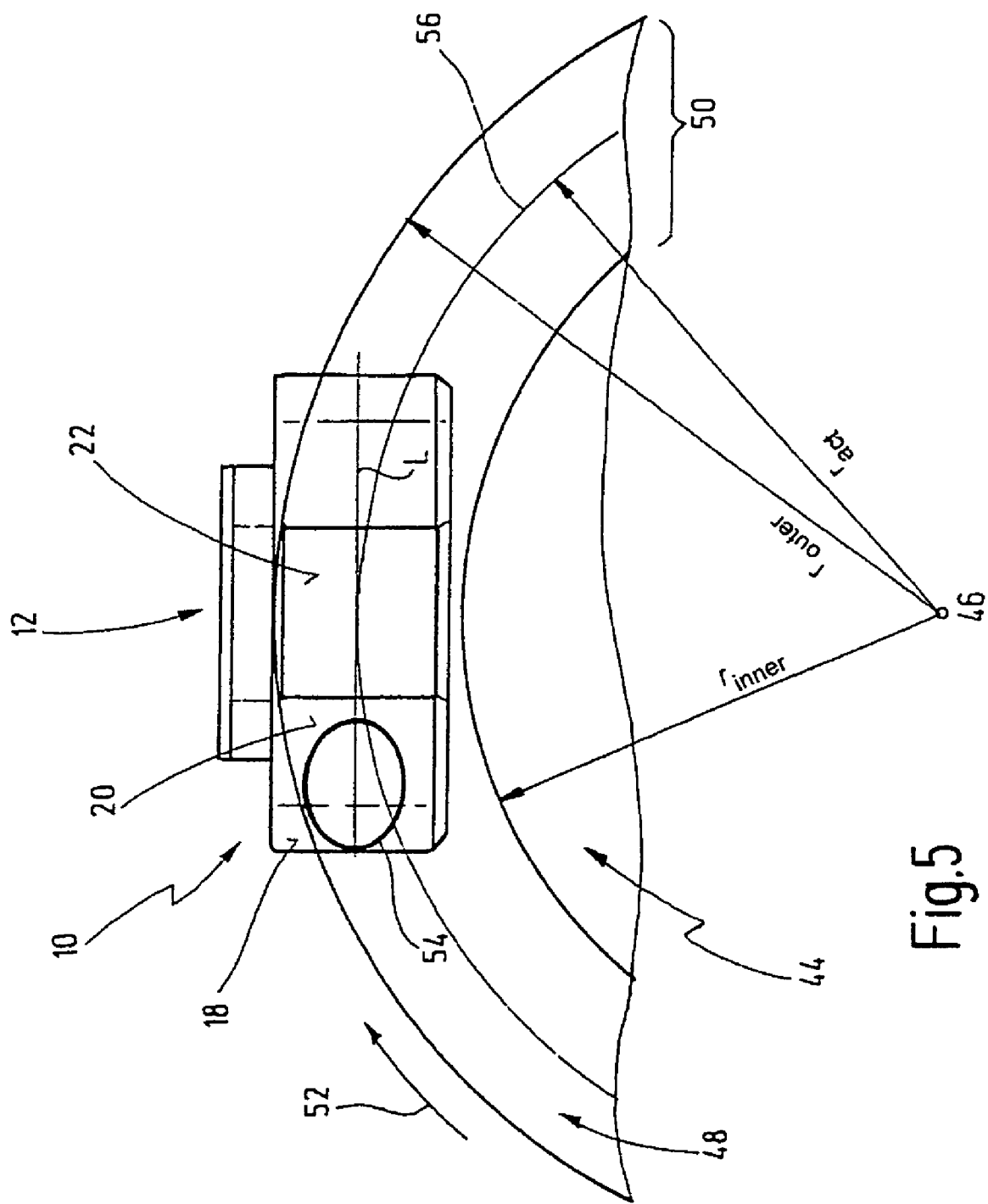
FIG. 5 shows a sliding block according to FIG. 1, as it engages into a shift drum or a shift groove of the latter, including the associated contact ellipse.

In FIG. 5, the sliding block 10 of FIG. 2 can be seen diagrammatically in engagement with a shift drum 44, illustrated partially. In this case, the sliding block 10 and the shift drum 44 are viewed from the axial direction of the shift drum 44. The axis of the shift drum 44 is designated by 46.

The shift drum 44 has an outer radius $r_{outer}$. Furthermore, a shift groove 48 is indicated diagrammatically in the circumferential direction of the shift drum 44, the depth of the shift groove 48 being indicated by the reference symbol 50. The depth 50 of the shift groove 48 is calculated from the difference between the outer radius $r_{outer}$ and an inner radius $r_{inner}$. The depth 50 of the shift groove 48 is generally of the order of magnitude of the height of the sliding block 10 without an elevation 26 or 28.

FIG. 5 also illustrates the guide curve L of the vertical crowning of the sliding block 10. Furthermore, the so-called active radius $r_{act}$ is depicted in FIG. 5. The active radius $r_{act}$ or the active diameter is a functional parameter on which the theoretical design of the entire shift-drum geometry and therefore of the entire actuator mechanism is based. The flanks of the sliding block and the flanks of the shift-roller groove ideally contact along the active diameter.

Due to the Hertzian pressure, however, a pressure ellipse 54 is formed during rotation of the shift drum 44 in direction of rotation 52.

As can easily be seen, the ellipse 54 lies essentially above the active diameter. The flanks 18 and 20 of the sliding block advance the ideal contact point, i.e. the active diameter. The contact point of the sliding block 10 is thus displaced in the direction of the tip flank 18 of the sliding block 10 and of the outer edge of the shift-drum groove, said outer edge being formed by $r_{outer}$.

This may result in damage and malfunctions in regions of the shift-drum groove which are subjected to high load, for example at a synchronization point or shift-through point. The displacement of the center point of the pressure ellipse 54 in relation to the line 56 of the active diameter results in an indefinable deviation of the values occurring in relation to the theoretically predetermined values. These effects arise to an increased extent in the case of small active diameters of the shift drum 44.

According to the present invention, these negative effects are eliminated in that the vertices of the vertical crowning are arranged along the circumference of the sliding block such that they coincide essentially with the line 56 of the active diameter.

Figure 6:
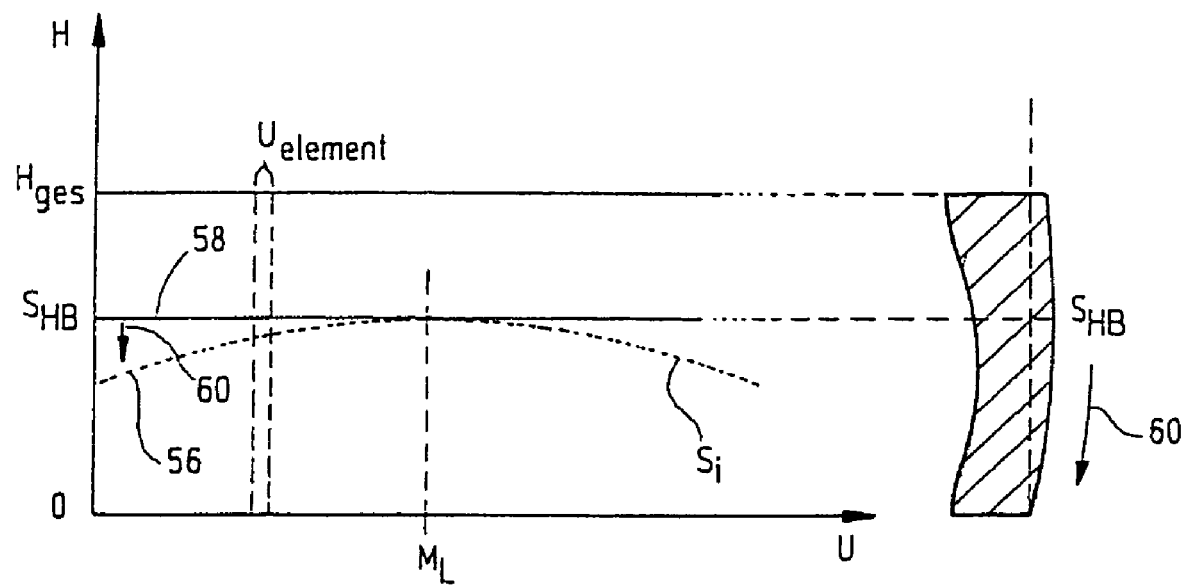
FIG. 6 shows a distribution of vertices of the vertical crowning along the circumference of a sliding block.

This is illustrated diagrammatically in FIG. 6, in which the height of a sliding block is plotted against the circumference of a sliding block.

Reference symbol $M_L$ indicates one of the two widest locations of a sliding block. The sliding block considered theoretically in FIG. 6 has an overall height $H_{overall}$. With a sliding block according to the prior art, all the vertices $S_{HB}$ of the vertical crowning lie on a line 58, as illustrated by way of example in FIGS. 1 and 4B/D by "L".

According to the present invention, the vertices $S_{HB}$ of the vertical crowning are "displaced" in the direction of the line 56 of the active diameter for each unit element $U_{element}$ of the circumference.

The right part of FIG. 6 partially illustrates a section through a sliding block according to the invention perpendicularly to the longitudinal axis at the point $M_L$. There, the vertex $S_{HB}$ of the vertical crowning is at the expected location. Moving away from the point $M_L$, however, according to the present invention the vertex $S_{HB}$ travels in the direction of the arrow 60.

Figure 7:
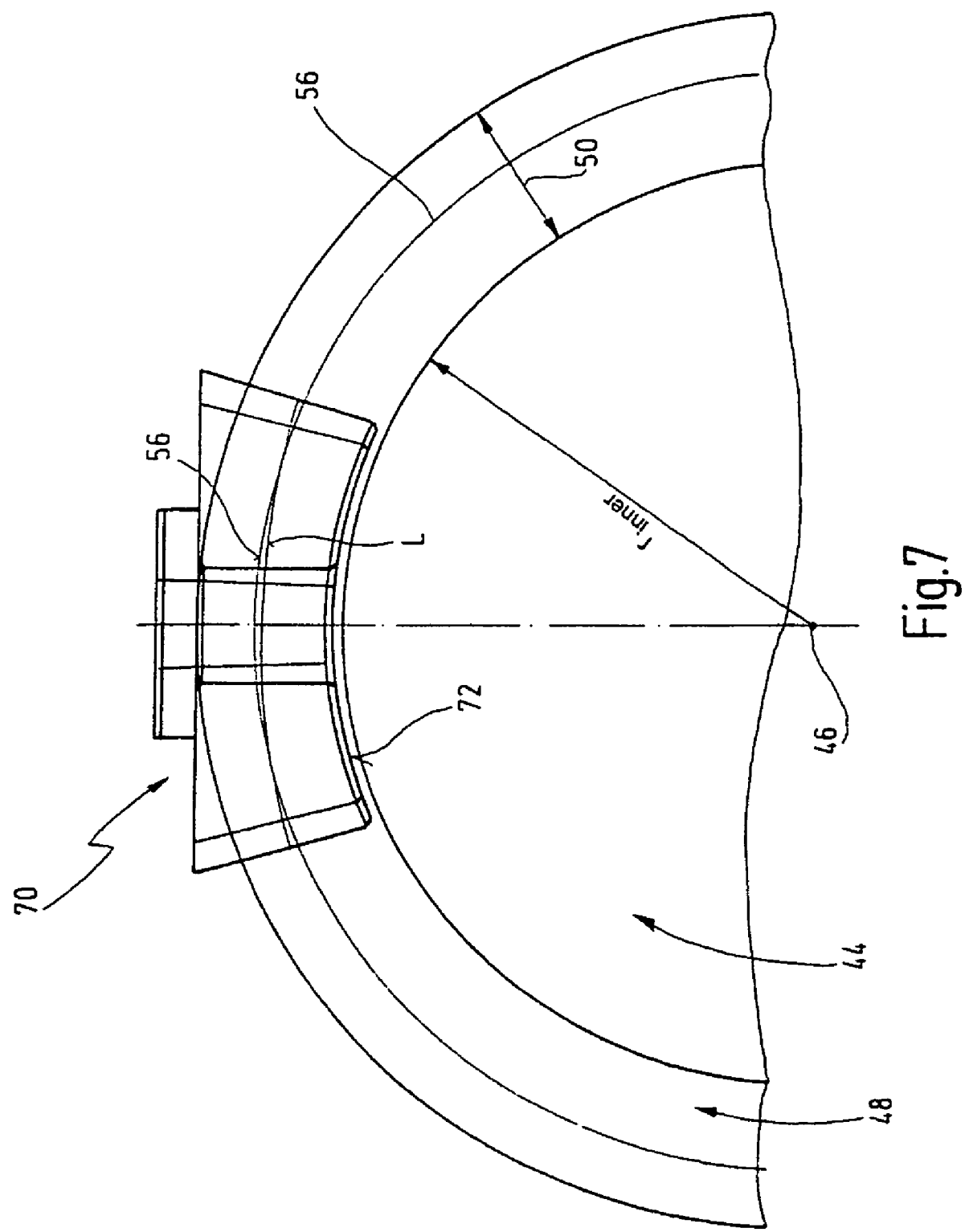
FIG. 7 shows a sliding block according to the invention which engages into a shift groove.

FIG. 7 shows a sliding block 10 according to the present invention which has a curved guide curve L of the vertical crowning. Furthermore, the sliding block 70 has a curved bottom surface 72 adapted to the inner radius $r_{inner}$. This, however, represents merely a preferred embodiment. Further, the bottom surface may also be formed without a curvature, as will become evident from FIG. 9.

Figure 1:
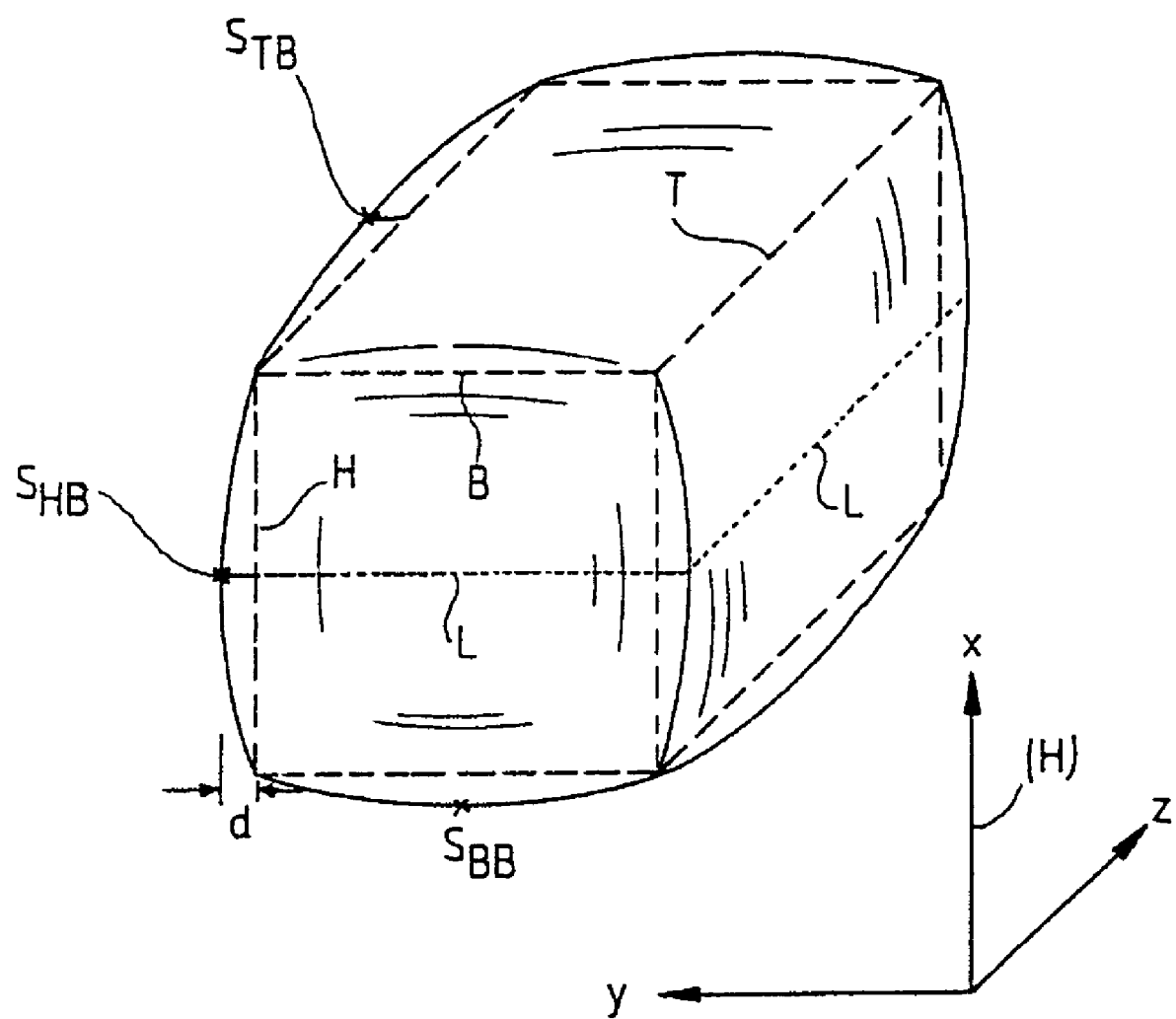
FIG. 1 shows a diagrammatic illustration of a parallelepiped with a vertical crowning and a longitudinal crowning along its circumference.

The sliding block 70 is constructed in a similar way to the sliding blocks 10 and 40 of FIGS. 1 and 4. Only the differences will be explained in more detail below.

Figure 8:
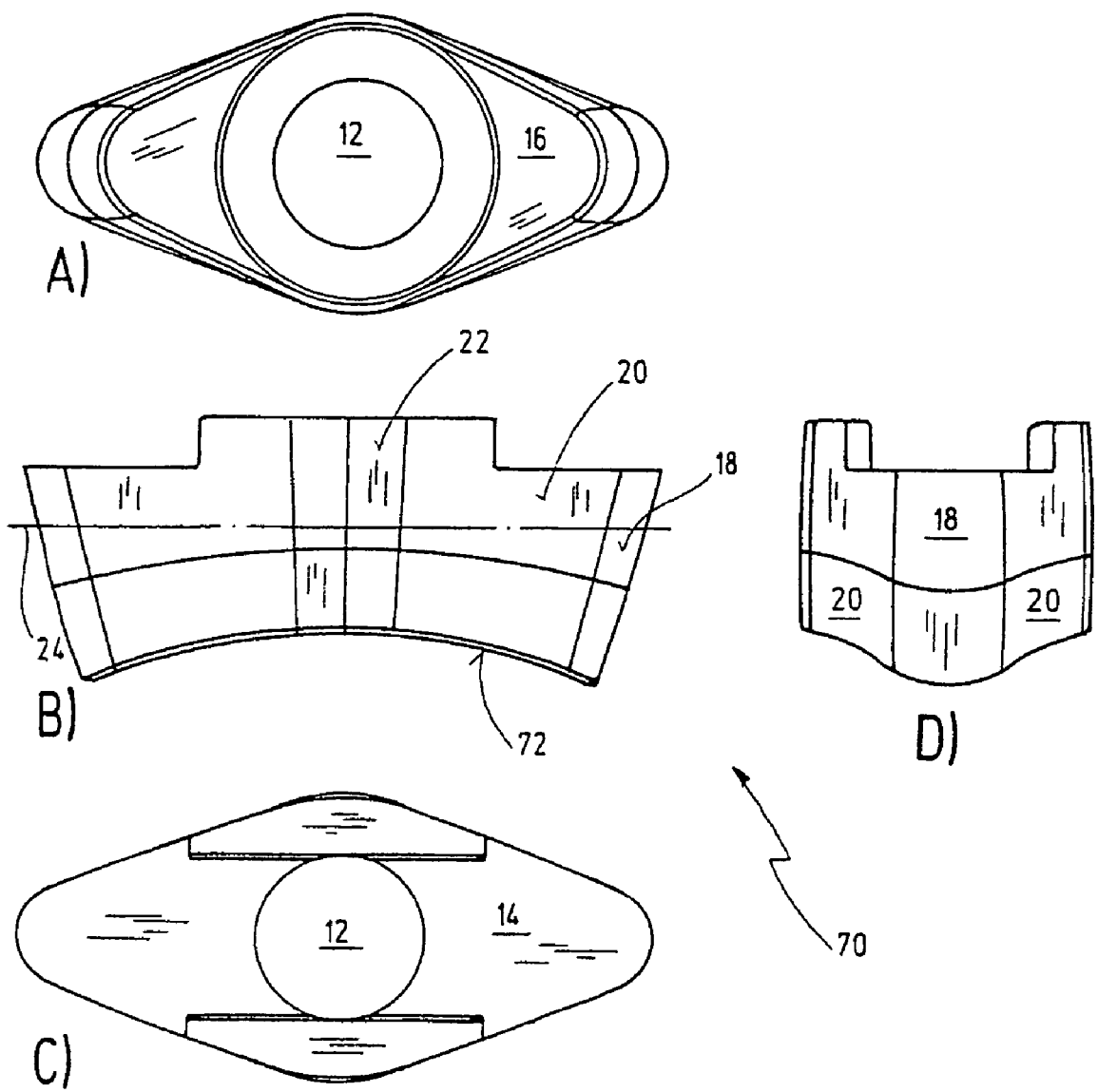
FIGS. 8A to 8D show various views of the sliding block of FIG. 7.

FIG. 8 shows the sliding block 70 of FIG. 7 in more detail. FIG. 8A shows a bottom view of the sliding block 70. FIG. 8B shows a side view of the sliding block 70. FIG. 8C shows a top view of the sliding block 70. FIG. 8D shows a view in the longitudinal direction 24. This corresponds to the front view.

Figure 9:
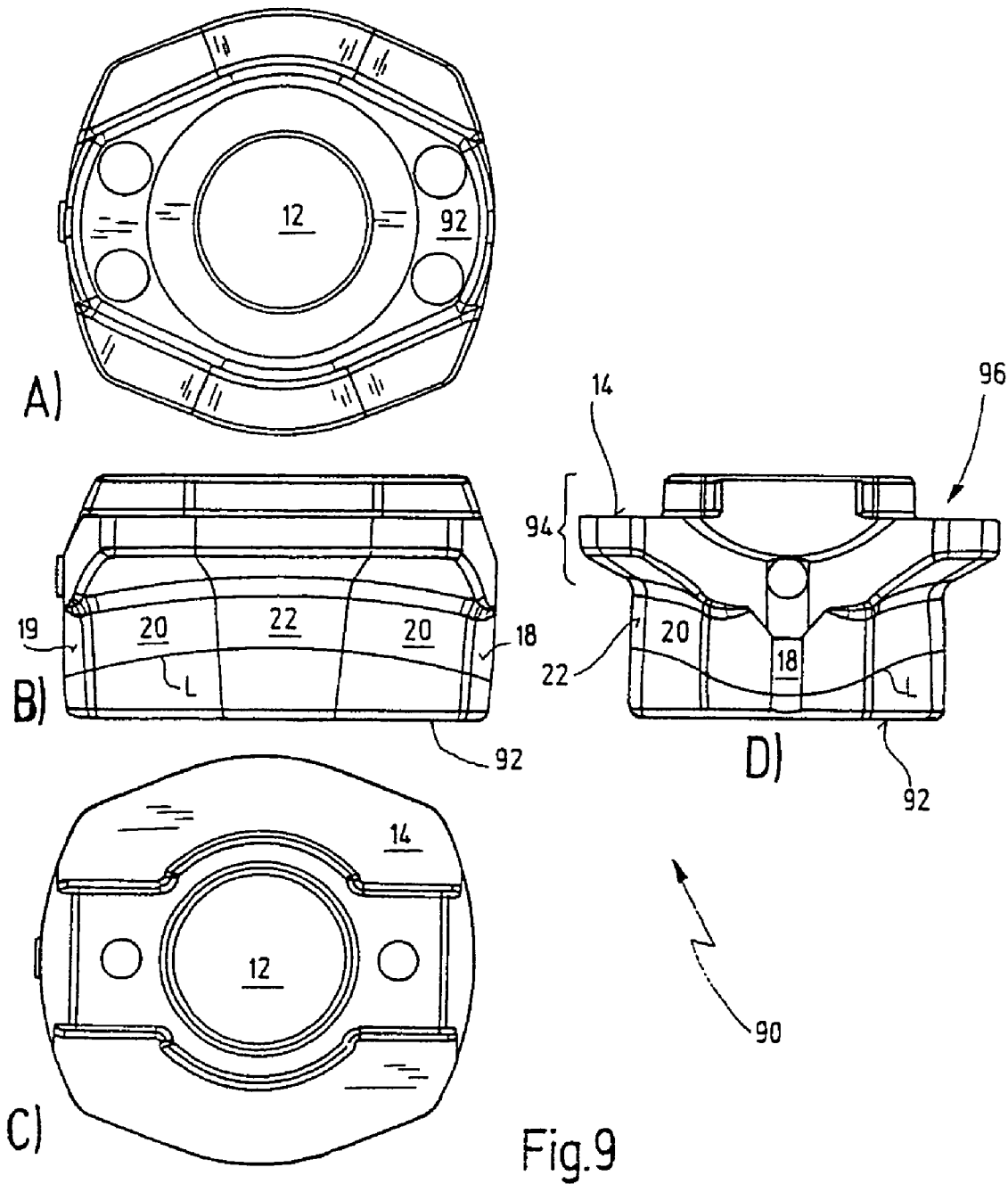
FIGS. 9A to 9D show various views of a further embodiment of a sliding block according to the present invention.

FIG. 9 shows a further embodiment of a sliding block 90 according to the present invention, an bottom surface 92 having no curvature.

Figure 10:
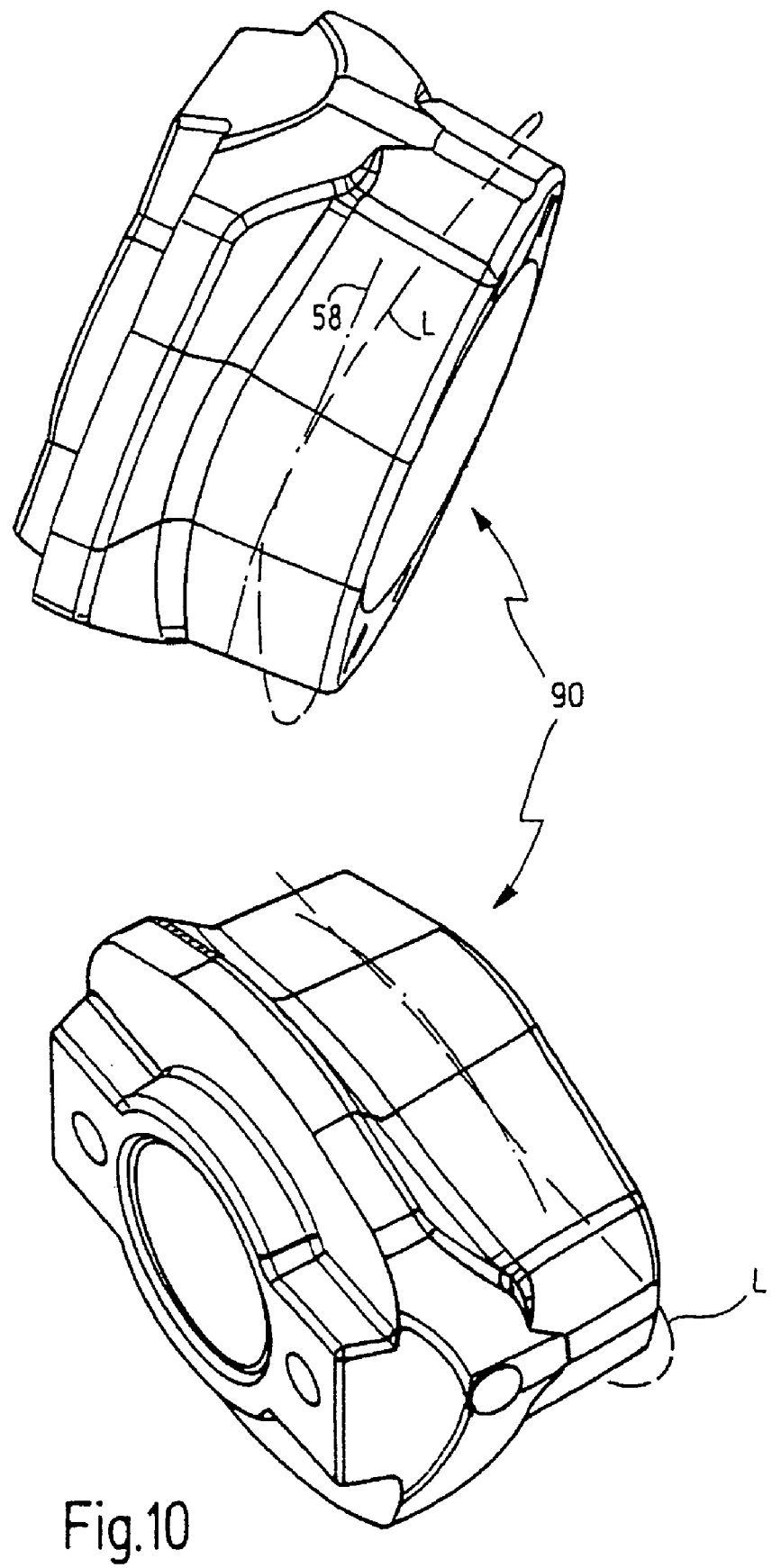
FIG. 10 shows two diagrammatic perspective views of the sliding block of FIG. 9.

FIG. 10 shows the sliding block 90 according to FIG. 9 in two diagrammatic perspective views.

As is evident from FIG. 9D, the sliding block 90 has in an upper region 94 a collar 96 which, in terms of its width, is greater than the width of a shift groove, so that, in an engaging state, the sliding block 90 projects with its region 94 laterally beyond the shift groove.

It goes without saying that various parameters of the sliding block or of a groove follower, such as, for example, the crowning radii, the tip angle α, the curvature diameter, etc., may be varied in order to further optimize the spatial position of the contact pattern between the sliding block flank and flank of the shift-drum groove.

As a result of the present invention, the wear or deformation of the shift-drum groove is minimized, and the operating reliability and also lifetime of the shift-drum-actuator mechanism are increased. Furthermore, considerable costs can be saved. Moreover, the parameters fixed in the theoretical design of the actuator are also achieved in reality. The radius of curvature of the guide curve may also deviate slightly from the radius of curvature of the active diameter (cf. FIG. 7), without the functionality allowed by the invention being appreciably restricted.

By a deviation in the radii of curvature, however, the position of the pressure ellipse can be optimized.

Should the shape of a shift drum deviate from rotational symmetry, so that the cross section of the shift groove is also no longer rotationally symmetrical, the term "active diameter" must be replaced by "active line".

What is claimed:

1. A groove follower for cooperating with a shift groove of a shift drum of a multi-step transmission for a motor vehicle, the groove follower having a vertical crowning and a longitudinal crowning, wherein the shift groove defines an active diameter along which the groove follower is to be guided in a state in which the groove follower engages into the shift groove, and wherein the entirety of all vertices of the vertical crowning forms a guide curve along the circumference of the groove follower, wherein a position of the vertices of the vertical crowning is selected such that the guide curve corresponds essentially to the active diameter of the shift drum.

2. The groove follower as claimed in claim 1, wherein the vertical crowning is provided not only along contact surfaces with groove flanks of the shift groove, but also along an entire circumference of the groove follower.

3. The groove follower as claimed in claim 1, wherein the groove follower is a sliding block.

4. The groove follower as claimed in claim 3, wherein the groove follower has a contact slope, the longitudinal crowning of the groove follower being formed along the contact slope.

5. The groove follower as claimed in claim 1, wherein the groove follower has a surface, which lies opposite to a bottom of the shift groove, has a curvature which corresponds essentially to a curvature of the shift groove.

* * * * *

UNITED STATES PATENT AND TRADEMARK OFFICE
CERTIFICATE OF CORRECTION

PATENT NO. : 7,631,576 B2  Page 1 of 1
APPLICATION NO. : 11/429641
DATED : December 15, 2009
INVENTOR(S) : Kapp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Twenty-first Day of December, 2010

David J. Kappos
*Director of the United States Patent and Trademark Office*